Patented Dec. 3, 1946

2,411,878

UNITED STATES PATENT OFFICE 2,411,878

COMPOSITE FILM AND METHOD

Albert Hershberger, Kenmore, N. Y., assignor to E. I. du Pont de Nemours & Company, Wilmington, Del., a corporation of Delaware No Drawing. Application September 21, 1942, Serial No. 459,187

10 Claims. (Cl. 154—139)

This invention relates to the lamination of dense, non-fibrous, non-vulcanizable, relatively non-porous, self-sustaining, synthetic film, sheets, pellicles and the like to copolymers of butadiene. More particularly this invention relates to the bonding of self-sustaining, non-vulcanizable, synthetic films of nylon, regenerated cellulose, cellulose esters, as cellulose acetate, polyvinyl alcohol, polyvinyl acetal, as polyvinyl butyral, etc. to rubber-like vulcanizable copolymers of butadiene, such as the copolymers of acrylonitrile and butadiene, of styrene and butadiene, and of isobutylene and butadiene.

Because of their exceptional resistance to the deteriorating influence of gasoline and relatively low penetrability of gasoline vapors, compounded stocks of rubber-like vulcanizable butadiene copolymers, such as the copolymers of butadiene with acrylonitrile, have been widely employed in the construction of self-sealing fuel tanks for military planes and like motorized equipment. However, with the advent of gasoline of very high octane rating due to the presence therein of aromatic hydrocarbons, the impenetrability of these copolymers is no longer entirely satisfactory and the need arises for materials exhibiting still higher resistance to the penetration of these vapors.

It has now been found that self-sustaining, non-vulcanizable, non-fibrous, synthetic film of materials such as nylon, regenerated cellulose, cellulose acetate, polyvinyl alcohol, polyvinyl acetals, etc., when laminated to rubber-like vulcanizable copolymers of butadiene possess the desired impenetrability. In addition, the fuel barrier so formed has the lightness, compactness, toughness and freedom from shattering which is essential in virtually all materials entering into airplane construction.

An object of this invention, therefore, is to provide for the bonding of self-sustaining, non-vulcanizable, non-fibrous, synthetic film to copolymers of butadiene. Another object is to provide a novel laminated structure of self-sustaining, non-vulcanizable, non-fibrous, synthetic film joined to rubber-like vulcanizable butadiene copolymer. A further object is to provide a light, compact, tough, non-shatterable, laminated structure of self-sustaining, non-vulcanizable, non-fibrous, synthetic film and rubber-like vulcanizable butadiene copolymer which is more impenetrable to gasoline vapors than is the same thickness of the butadiene copolymer alone. A still further object is to provide a tenacious bond between self-sustaining, non-vulcanizable, non-fibrous, synthetic film and rubber-like vulcanizable butadiene copolymer, which bond is not affected by gasoline. These and other objects will more clearly appear hereinafter.

The above objects are accomplished by this invention which, briefly stated, comprises applying to either the self-sustaining, non-vulcanizable, non-fibrous, synthetic film or to the butadiene copolymer, or to both, a liquid composition comprising essentially polyvinyl butyral and thermo-setting, resin-forming ingredients comprising polyhydric phenol, aldehyde and a basic polymerization catalyst, dissolved together in a volatile organic solvent, causing the resin-forming ingredients to react whereby to form an adhesive coating, and thereafter pressing together the film and copolymer with the adhesive coating therebetween, at an elevated temperature.

It is essential that the polyvinyl butryal used in the adhesive composition be one in which at least 30%, but no more than 90%, of the hydroxyl groups of polyvinyl alcohol are substituted by reacting the polyvinyl alcohol with butyraldehyde. This corresponds to the range of from 20.7% to 47.4% combined butyraldehyde. The polyvinyl butyrals in which the degree of substitution is in the range of from 50% to 85% (31.3% to 45.7% combined butyraldehyde) are preferred.

The polyvinyl butyrals produced by butyralization of polyvinyl alcohol substantially free of any ester groups are preferred. However, polyvinyl butyrals containing a minor proportion of ester groups may be used with good results.

As the thermo-setting, resin-forming ingredients of the adhesive, the polyhydric phenols and aldehydes which are soluble to the extent of 1% to 10% or more in the organic solvent employed, are preferred. The resin should be capable of polymerizing rapidly and completely to a substantially insoluble, infusible stage at temperatures of about 125° C. or less. The polyhydric phenols having the hydroxyl groups in the benzene nucleus meta with respect to one another, such as resorcinol, phloroglucinol and orcinol are preferred. Also suitable are the naturally occurring polyhydric phenols, e. g. the tannins extracted from the bark of the quebracho tree, known as quebracho extract. As the aldehyde member of the resin-forming ingredients, formaldehyde, para-formaldehyde, acetaldehyde, furfural and aldol are especially satisfactory. Preferably, the aldehyde is used in some excess of that theoretically required to react with all the phenol present in order to insure polymerization of all the phenol.

A basic catalyst, to promote polymerization of the resin-forming ingredients, such as NaOH, KOH, etc., in concentrations of 0.5% to 1.5% by weight, on the basis of the resin-forming materials, is preferred.

The ratio of the partial polyvinyl butyral to the polyhydric phenol-aldehyde resin-forming ingredients is important. Best results are obtained when the partial polyvinyl butyral is used in concentrations between 30% and 45% of the total weight of the solvent-free adhesive layer, although good results are obtainable when the concentration of the polyvinyl butyral resin is within the range of from 25% to 60% of the total weight of the solvent-free adhesive layer.

The composition consisting of a polyvinyl butyral and the resin-forming ingredients dissolved in a suitable organic solvent may be applied to the film, sheet or pellicle by spraying, by brushing, by doctoring or by any other suitable means, and the solvent evaporated at room temperature or at an elevated temperature. At some stage in the drying process or subsequent to drying, it is preferred that the temperature be raised to a point above 65° C., but not in excess of 125° C., for a short time to insure polymerization of the resin-forming materials to a substantially insoluble, infusible form. However, final heating of the polyhydric phenol-aldehyde resin to the infusible, insoluble state need not take place until the laminated structure is subjected to an elevated temperature to cure the compounded butadiene copolymer.

The butadiene copolymers, such as the copolymer of acrylonitrile and butadiene, the copolymer of styrene and butadiene, and the copolymer of isobutylene and butadiene, may be mixed or compounded with any of the usual compounding materials, such as pigments, fillers, softeners or plasticizers, accelerators, stabilizers, dispersing agents, aging resistors, sulfur, etc. It is essential, however, that the butadiene copolymer be uncured at the time it is joined to the adhesive layer and cured in place.

The film, sheet or pellicle to which the butadiene copolymer may be adhered includes any of the dense, non-fibrous, relatively non-porous, self-sustaining, synthetic films available, such as films of nylon, regenerated cellulose, cellulose esters, such as cellulose acetate, cellulose propionate, cellulose aceto-propionate, cellulose aceto-butyrate, polyvinyl alcohol, polyvinyl acetal, or mixed acetals such as polyvinyl formal, polyvinyl propional, polyvinyl benzyl formal, and especially certain partial polyvinyl butyrals. The polyvinyl butyrals in which at least 40% (26.3% combined butyraldehyde), but no more than 65% (38.1% of combined butyraldehyde), of the hydroxyl groups of polyvinyl alcohol are substituted by reacting the polyvinyl alcohol with butyraldehyde, are exceptionally useful as fuel barriers in view of their low permeability factor and relatively high resistance to shattering. The partial polyvinyl butyrals in which the degree of hydroxyl substitution is in the range of from 50% to 60% (31.3% to 35.8% combined butyraldehyde) are preferred.

The pressure, temperature and time under which the laminated structure is finally set up and the butadiene copolymer cured, may of course be varied within reasonable limits. It is generally desirable to maintain the structure under reasonably high pressure, for example, at least 100 pounds per square inch, to obtain the best bond, but reasonably satisfactory results can be obtained by setting up the structure at substantially lower pressures, e. g. 5 to 10 pounds per square inch. Also, the temperatures of curing will vary, depending on the specific butadiene copolymer and various compounding ingredients in the compounded stock. In general, this temperature may range from 80° C. to 160° C. Also, the time may be varied. At the lower temperatures, it is generally advisable to prolong the period for setting up the structure and curing the butadiene copolymer, while at the higher temperatures the time can be somewhat shorter. While the time may be varied from a few minutes to several hours, in general the time range from 20 minutes to 80 minutes is preferred.

The following examples further illustrate the invention. Parts are by weight.

*Example I*

An adhesive for bonding polyvinyl alcohol film to "Ameripol" (a compounded acrylonitrile-butadiene copolymer) is prepared as follows: 15 parts of polyvinyl butyral prepared by combining about 85% of the hydroxyl groups of polyvinyl alcohol with butyraldehyde are dissolved in 85 parts of ethyl alcohol denatured with methyl alcohol. To this solution is added a solution comprised of 15 parts of resorcinol, 31 parts of formalin (37% formaldehyde in water), 3 parts of 10% solution of NaOH in water and 104 parts of ethyl alcohol denatured with methyl alcohol. After thoroughly mixing the two solutions together, the composition is applied to a polyvinyl alcohol film to form a coating thereon when dry that is not greater than 0.0001 inch in thickness. The coated film is allowed to air-dry for a few minutes to evaporate the bulk of the solvent therefrom and then a sheet of "Ameripol" is pressed on by hand with the aid of a squeezing roller and the laminated structure is subjected to heat for 30 minutes at 90° C. It was found that the "Ameripol" adhered very well to the polyvinyl alcohol film and could be separated only with great difficulty.

When the laminated structure was prepared similar to the process described above but cured in a press at 135° C. for 40 minutes while held under pressure of 250 pounds per square inch, the "Ameripol" was so tenaciously bonded to the polyvinyl alcohol film that the two could not be separated without tearing the "Ameripol" or the film.

*Example II*

A similar adhesive as in Example I for bonding polyvinyl butyral prepared by reacting 55% (about 33.7% combined butyraldehyde) of the hydroxyl groups of polyvinyl alcohol with butyraldehyde to "Hycar" (a compounded acrylonitrile-butadiene copolymer) is prepared as follows: 15 parts of polyvinyl butyral prepared by combining about 73% of the hydroxyl groups of polyvinyl alcohol with butyraldehyde are dissolved in 85 parts of ethyl alcohol denatured with methyl alcohol. To this solution is added a solution comprised of 15 parts of resorcinol, 30 parts of formalin (37% formaldehyde in water), 3 parts of 10% solution of NaOH in water and 100 parts of ethyl alcohol denatured with methyl alcohol. After thoroughly mixing the two solutions together, this composition is applied to a sheet of "Hycar" and after air-drying for some minutes, the polyvinyl butyral film is applied against the resin-coated surface and the laminae pressed together under a pressure of 250 pounds per square inch and heated to a temperature of 135° C. for 40 minutes while maintaining the pressure. The polyvinyl butyral could not be separated from the "Hycar" without tearing one or the other.

*Example III*

The adhesive prepared as in Example II is applied to a film of nylon and after the solvent is substantially eliminated by air-drying, a sheet of "Hycar" is applied against the resin-coated surface and the laminae pressed together under a pressure of 250 pounds per square inch and heated to a temperature of 135° C. for 40 minutes while maintaining the pressure. It was found that the "Hycar" adhered to the nylon film tenaciously and could not be separated without tearing the "Hycar" or the film.

While it is generally preferred to coat the butadiene copolymer with the adhesion composition herein described, substantially as good results are obtained by applying the adhesive to the film or by applying the adhesive coating to both the film and the butadiene copolymer.

The laminated structures comprised of synthetic films and butadiene copolymers and prepared in accordance with this invention are especially useful as fuel barriers in self-sealing fuel tanks for military and naval airplanes. Not only is the film, which is bonded to the butadiene copolymer exceptional in its low permeability but the adhesive layer itself, which is extremely thin, being of the order of 0.0001 inch in thickness, contributes substantially to the impermeability of the laminated structure forming the fuel tanks. The satisfactory joining of butadiene copolymers and compounded stock containing the same to various synthetic films, sheets, pellicles, and the like provides laminated structures that are eminently suited for various uses, not only in connection with airplanes and other armaments, but also in various fields of civilian use. Furthermore, the preparation of laminated structures in accordance with this invention is simple and no very high temperature nor long period of baking is required to set up the resin in the adhesive.

Since it is obvious that various changes and modifications may be made without departing from the nature and spirit of the invention, it is to be understood that the invention is not to be limited except as set forth in the following claims.

I claim:

1. A method for laminating self-sustaining, non-vulcanizable, non-fibrous, synthetic film material with butadiene copolymer material which comprises forming on the surface of at least one of said materials an adhesive composition consisting essentially of a polyvinyl butyral containing 20.7% to 47.4% combined butyraldehyde, and a polyhydric phenol-aldehyde resin, and thereafter bringing said materials into association and with said adhesive composition therebetween, and maintaining said associated materials at an elevated temperature for a sufficient length of time to firmly unite said materials and to cure said butadiene copolymer material.

2. A method for laminating self-sustaining, non-vulcanizable, non-fibrous, synthetic film material with butadiene copolymer material which comprises forming on the surface of at least one of said materials an adhesive composition consisting essentially of a polyvinyl butyral containing 20.7% to 47.4% combined butyraldehyde, and a polyhydric phenol-aldehyde resin, and thereafter pressing said materials together with the adhesive composition therebetween and maintaining said pressed materials at an elevated temperature for a sufficient length of time to firmly unite said materials and to cure said butadiene copolymer material.

3. A method for laminating self-sustaining, non-vulcanizable, non-fibrous, synthetic film material with butadiene copolymer material which comprises forming on the surface of at least one of said materials an adhesive composition consisting essentially of a polyvinyl butyral containing 31.3% to 45.7% combined butyraldehyde, and a polyhydric phenol-aldehyde resin, and thereafter pressing said materials together with the adhesive composition therebetween and maintaining said pressed materials at an elevated temperature for a sufficient length of time to firmly unite said materials and to cure said butadiene copolymer material.

4. A method for laminating self-sustaining, non-vulcanizable, non-fibrous, synthetic film material with rubber-like vulcanizable butadiene copolymer material which comprises applying to a surface of at least one of said materials a liquid composition consisting essentially of a polyvinyl butyral containing 20.7% to 47.4% combined butyraldehyde, and resin-forming ingredients consisting of a polyhydric phenol, an aldehyde and a basic polymerization catalyst, dissolved together in a volatile organic solvent, heating to convert the resin-forming ingredients to a resin whereby to form an adhesive coating, and thereafter bringing said materials into association and with said adhesive composition therebetween, and maintaining said associated materials at an elevated temperature for a sufficient length of time to firmly unite said materials and to cure said butadiene copolymer material.

5. A method for laminating self-sustaining, non-vulcanizable, non-fibrous, synthetic film material with rubber-like vulcanizable butadiene copolymer material which comprises applying to a surface of at least one of said materials a liquid composition consisting essentially of a polyvinyl butyral containing 20.7% to 47.4% combined butyraldehyde, and resin-forming ingredients consisting of a polyhydric phenol, an aldehyde and a basic polymerization catalyst, dissolved together in a volatile organic solvent, heating to convert the resin-forming ingredients to a resin whereby to form an adhesive coating, and thereafter pressing said materials together with the adhesive composition therebetween and maintaining said pressed materials at an elevated temperature for a sufficient length of time to firmly unite said materials and to cure said butadiene copolymer material.

6. A method for laminating self-sustaining, non-vulcanizable, non-fibrous, synthetic film material with rubber-like vulcanizable butadiene copolymer material which comprises applying to a surface of at least one of said materials a liquid composition consisting essentially of a polyvinyl butyral containing 31.3% to 45.7% combined butyraldehyde, and resin-forming ingredients consisting of a polyhydric phenol, an aldehyde and a basic polymerization catalyst, dissolved together in a volatile organic solvent, heating to convert the resin-forming ingredients to a resin whereby to form an adhesive coating, and thereafter pressing said materials together with the adhesive composition therebetween and maintaining said pressed materials at an elevated temperature for a sufficient length of time to firmly unite said materials and to cure said butadiene copolymer materials.

7. A method for laminating self-sustaining, non-vulcanizable, non-fibrous, synthetic film material with rubber-like vulcanizable butadiene copolymer material which comprises applying to a surface of at least one of said materials a liquid composition consisting essentially of a polyvinyl butyral containing 31.3% to 45.7% combined butyraldehyde, and resin-forming ingredients consisting of a polyhydric phenol, an aldehyde and a basic polymerization catalyst, dissolved together in a volatile organic solvent, heating to convert the resin-forming ingredients to a resin whereby to form an adhesive coating and thereafter joining said materials together with the adhesive therebetween and maintaining a pressure of at least 100 pounds per square inch and a temperature of from 80° C. to 160° C. for a sufficient length of time to firmly adhere said materials.

8. An article of manufacture comprising a self-sustaining, non-vulcanizable, non-fibrous, synthetic film bonded to a butadiene copolymer by a composition consisting essentially of a polyvinyl butyral containing 20.7% to 47.4% combined butyraldehyde, and a substantially insoluble, infusible polyhydric phenol-aldehyde resin.

9. An article of manufacture comprising a self-sustaining, non-vulcanizable, non-fibrous, synthetic film bonded to a butadiene copolymer by a composition consisting essentially of a polyvinyl butyral containing 31.3% to 45.7% combined butyraldehyde, and a substantially insoluble, infusible polyhydric phenol-aldehyde resin.

10. A composite self-sustaining film comprising a self-sustaining, non-vulcanizable, non-fibrous, synthetic film laminated to a film of a rubber-like vulcanizable butadiene copolymer by a composition consisting essentially of a polyvinyl butyral containing 31.3% to 45.7% combined butyraldehyde, and a substantially insoluble, infusible polyhydric phenol-aldehyde resin.

ALBERT HERSHBERGER.